US012220893B2

(12) United States Patent
Kossmann et al.

(10) Patent No.: US 12,220,893 B2
(45) Date of Patent: Feb. 11, 2025

(54) CREPE BLADE

(71) Applicant: CLOUTH SPRENGER GMBH, Hückeswagen (DE)

(72) Inventors: Joerg Kossmann, Essen (DE); Arne Gerhardt, Duisburg (DE); Eugen Gorbatschewski, Kamp-Lintfort (DE); Mariusz Gilla, Moers (DE)

(73) Assignee: CLOUTH SPRENGER GMBH, Hückeswagen (DE)

(*) Notice: Subject to any disclaimer, the term of this patent is extended or adjusted under 35 U.S.C. 154(b) by 117 days.

(21) Appl. No.: 17/776,607

(22) PCT Filed: Aug. 28, 2020

(86) PCT No.: PCT/EP2020/074083
§ 371 (c)(1),
(2) Date: May 13, 2022

(87) PCT Pub. No.: WO2021/121687
PCT Pub. Date: Jun. 24, 2021

(65) Prior Publication Data

US 2022/0396048 A1 Dec. 15, 2022

(30) Foreign Application Priority Data

Dec. 18, 2019 (DE) ......................... 102019134982.6

(51) Int. Cl.
*B31F 1/14* (2006.01)
*D21G 3/04* (2006.01)

(52) U.S. Cl.
CPC ............... *B31F 1/145* (2013.01); *D21G 3/04* (2013.01)

(58) Field of Classification Search
CPC ....... D21G 3/005; B31F 1/145; C23C 28/341; C23C 28/347; C23C 4/10
See application file for complete search history.

(56) References Cited

U.S. PATENT DOCUMENTS 3,163,575 A 12/1964 Nobbe
6,207,021 B1 * 3/2001 Eriksson ................. B31F 1/145 34/120

(Continued)

FOREIGN PATENT DOCUMENTS

CN 1874886 B * 12/2010 ................ B31F 1/00
DE 102006001336 A 7/2007

(Continued)

OTHER PUBLICATIONS

Machine Translation of DE 102009029699 A1 (Year: 2011).*
Machine Translation of DE 102011115813 A1 (Year: 2013).*

*Primary Examiner* — Jose A Fortuna
(74) *Attorney, Agent, or Firm* — Harness, Dickey & Pierce, P.L.C.

(57) ABSTRACT

The invention relates to a creping blade (1) with a blade-like main part (8) made of metal, in particular steel or stainless steel, said main part having a working edge (2) which can be placed against a drying cylinder (3) and which adjoins an end face (4) with a counter-edge (5). Grooves (6) are worked into the end face (4) and are arranged at a distance to one another, and a wear protection layer (7) is provided on the wall of the main part (9) between the working edge (2) and the main part (8), wherein the grooves (6) are worked at least into the wear protection layer (7).

7 Claims, 1 Drawing Sheet

(56) References Cited

U.S. PATENT DOCUMENTS

| | | | | |
|---|---|---|---|---|
| 6,425,983 | B1 | 6/2002 | Marinack | |
| 6,455,129 | B1 | 9/2002 | Kershaw | |
| 7,244,340 | B2 * | 7/2007 | Laithier | D21G 3/005 162/280 |
| 7,691,236 | B2 * | 4/2010 | Conn | B31F 1/145 162/280 |
| 8,206,556 | B2 * | 6/2012 | Claudon | B31F 1/145 15/256.51 |
| 10,125,455 | B2 * | 11/2018 | Millward | C23C 4/12 |
| 12,128,647 | B2 * | 10/2024 | Claudon | D21G 3/04 |
| 2003/0106656 | A1 * | 6/2003 | Johnson | B31F 1/145 162/111 |
| 2021/0053311 | A1 * | 2/2021 | Zhou | C23C 4/10 |
| 2022/0396048 | A1 * | 12/2022 | Kossmann | B31F 1/145 |
| 2024/0011222 | A1 * | 1/2024 | Jonsson | D21F 5/181 |
| 2024/0262071 | A1 * | 8/2024 | Claudon | D21G 3/04 |

FOREIGN PATENT DOCUMENTS

| | | | | |
|---|---|---|---|---|
| DE | 102009029699 | A1 * | 3/2011 | D21G 3/005 |
| DE | 102011115813 | A | 4/2013 | |
| DE | 102011115813 | A1 * | 4/2013 | B31F 1/145 |
| EP | 1090742 | A1 * | 4/2001 | B31F 1/145 |
| EP | 4076931 | B1 * | 10/2023 | B31F 1/145 |
| FI | 4076931 | T3 * | 12/2023 | B31F 1/145 |
| GB | 2128551 | A | 5/1984 | |

* cited by examiner

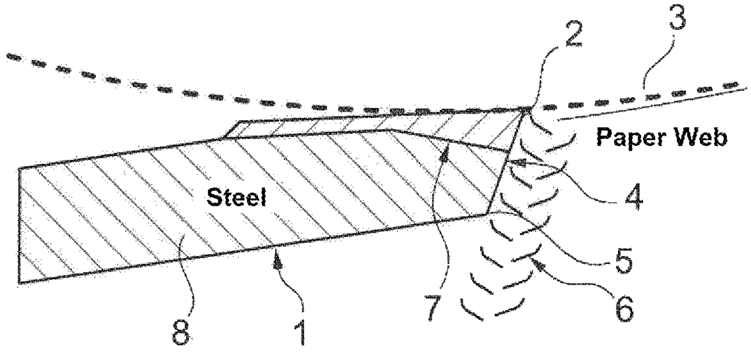
Fig. 1
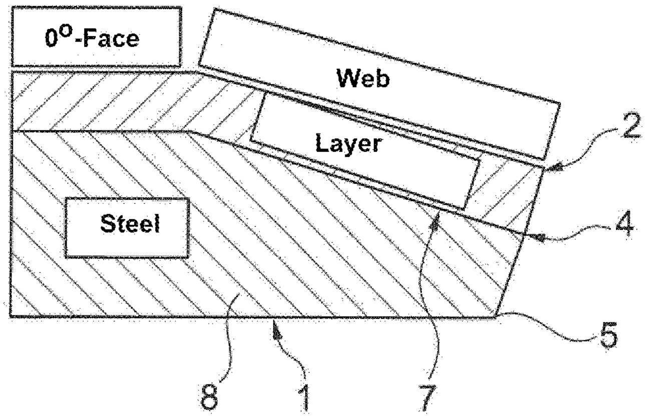
Fig. 2
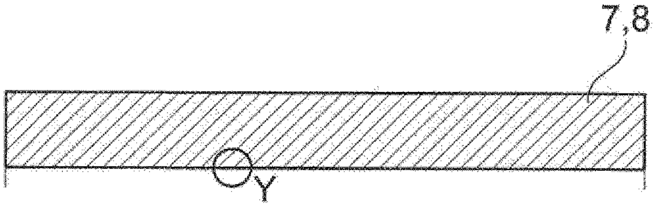
Fig. 3
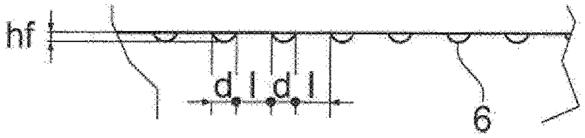
Fig. 4
Fig. 5
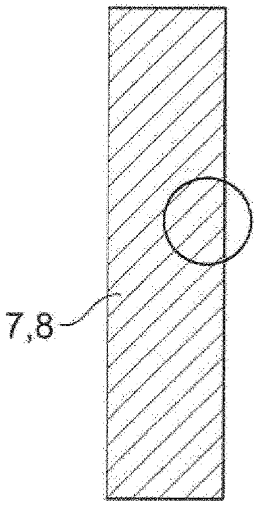
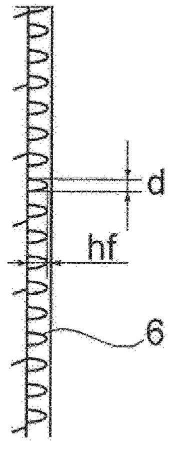
Fig. 6

CREPE BLADE

CROSS REFERENCE TO RELATED APPLICATIONS

This application is the US-national stage of PCT application PCT/EP2020/074083 filed 28 Aug. 2020 and claiming the priority of German patent application 102019134982.6 itself filed 18 Dec. 2019.

BACKGROUND OF THE INVENTION

The invention relates to a creping blade having a blade-shaped body made of metal, in particular of steel or stainless steel, and a cutting edge that can be applied to a drying cylinder and from which an end face extends to a counter-edge, wherein grooves are machined into the end face at spacings from one another.

A crepe scraper of the generic type is known from EP 1 157 818. In this creping blade, grooves are machined into the end face and are at a spacing from one another. The grooves are intended to improve the workload of the creping blade. However, it is disadvantageous that the wear on the cutting edge is not immaterial since the creping blade and in particular the cutting edge are not wear-resistant.

OBJECT OF THE INVENTION

The object of the invention is to improve a crepe blade of the generic type in such a way that the described disadvantages are avoided.

SUMMARY OF THE INVENTION

According to the invention, an antiwear layer is provided between the blade edge and the body on a side face of the body and the grooves, which can also be referred to as recesses, notches, interruptions or the like, are formed at least in the antiwear layer. This results in a wear-resistant cutting edge, the advantages of the grooves or notches being retained. The grooves can be produced by embossing with a knurled tool. However, they can also be cut, in particular in the region of the antiwear layer, by grinding, in particular milling.

The depth of the grooves is preferably about 200 μm, with the width of the grooves preferably being about 350 μm. Advantageously, the antiwear layer is preferably about 30 μm thick. These geometric data can vary alone, in combination or all together by +/−5%, optionally also by +/−10% and further optionally by +/−20%, depending on the application and geometric size of the creping blade.

It is advantageous if the width (d) of the grooves at the cutting edge is smaller than their spacing (I). As a result, the spacing of the grooves from one another is greater than their widths. The depth (ht) of the grooves at the cutting edge is smaller than to the widths (d) of the grooves, and it follows that the depth of the grooves is smaller than their width.

In a further embodiment of the invention, it is proposed that the notches are of uniform cross-sectional shape between the cutting edge and the counter-edge as grooves. However, the grooves can also run decrease in cross-sectional size away from the cutting edge and toward the counter edge. It is then advantageous that the length (hf) of the grooves is less than 5 times their maximum depth (ht). This means that the length of the grooves is greater than their depths.

In a further development of the invention, it is proposed that the antiwear layer is a laminate and has a ceramic layer, a layer of a mixture of oxidic ceramics and a ceramic-metal layer. These layers are in particular constructed in such a way that they form on the one hand base hardness and, on the other hand, high wear resistance.

A creping blade is known from DE 10 201 1 115 813, on the cutting edge/side wall of which a plurality of ceramic layers are applied. However, these are straight at the cutting edge, i.e. without interruptions or grooves.

BRIEF DESCRIPTION OF THE DRAWING

An embodiment of the invention is illustrated in simplified form in the drawings in which:

FIG. 1 is a schematic side view of a creping blade and a drying cylinder,

FIG. 2 is a section through a creping blade in the region of the cutting edge in enlarged scale, FIG. 3 is a section detail of the creping blade, FIG. 4 is a large-scale view through the creping blade according to circle Y in FIG. 3, FIG. 5 is another section through the creping blade, and FIG. 6 is a large-scale view of the creping blade according to the circle in FIG. 5.

SPECIFIC DESCRIPTION OF THE INVENTION

In FIGS. 1 to 6, a creping blade is shown in detail in FIG. 1 in operative connection with a drying cylinder 3 at a cutting edge 2. Starting from the blade edge 2, the creping blade 1 has an end face 4 that extends as far as a counter-edge 5. Grooves 6 are formed on the end face 4 as illustrated in FIGS. 1 and 4. Furthermore, on a side face turned toward the drying cylinder 3, the creping blade 1 has a wear-protection layer 7 that forms the blade edge 2 with the end face 4. The grooves 6 are formed both in a body 8 of the creping blade 1 and in the wear-protection layer 7.

As can be seen in particular from FIG. 2, the partial surface of the body 8 below the antiwear layer 7 that extends as far as the end face 4, is designed as a bevel with a bevel angle of a maximum of 25°. The grooves 6 can be square with approximately a rectangular cross section or round corresponding to a semicircular cross section or also of wedge section or the like. The body 8 of the creping blade 1 is made of steel or stainless steel and can be ground with the bevel, and the end face 4 is also ground at an angle or at an angle to the longitudinal plane of the creping blade 1. The grooves 6 on the end face 4 can be formed in particular on the body 8 by embossing. The grooves 6 are produced in the antiwear layer 7 preferably by grinding or milling.

In the section of FIG. 4 and the view of FIG. 6, the width of the grooves 6, the spacing of the grooves 6 from one another and the depth of the grooves 8 are denoted by d, I and ht, respectively. The grooves 6 according to FIG. 6 are of uniform depth, and their length is referenced at hf.

The ceramic layer preferably consists of titanium oxide, aluminum oxide, chromium oxide, zirconium oxide or the like. In particular, chromium oxide/zirconium oxide is proposed as a mixture of oxidic ceramics. WC or $Cr_3C_2$ are provided in particular for the ceramic metal (cermet) layers.

The invention claimed is:

1. A creping blade comprising:

a blade-shaped steel body that has a cutting edge juxtaposable with a drying cylinder and that merges with an end face forming a counter-edge, wherein grooves are formed in the end face and are spaced from one another; and an antiwear layer between the cutting edge and a side face of the body turned toward the drying cylinder, wherein the antiwear layer forms the cutting edge, and wherein the grooves are formed both in the body and in the antiwear layer.

2. The creping blade according to claim 1, wherein a width of the grooves at the cutting edge is less than a spacing between the grooves.

3. The creping blade according to claim 1, wherein a depth f the grooves on the cutting edge is less than a width of the grooves.

4. The creping blade according to claim 1, wherein the grooves are of uniform cross-sectional shape between the cutting edge and the counter-edge.

5. The creping blade according to claim 1, wherein the grooves extend from the cutting edge toward the counter edge, and a length of the grooves is less than 5 times a maximum depth of the grooves.

6. The creping blade according to claim 1, wherein the antiwear layer is a laminate and has a ceramic layer, a layer of a mixture of oxidic ceramics, and a ceramic-metal layer.

7. A creping blade for use with a drying cylinder, the blade comprising:

a steel body having a side face turned radially toward the cylinder and an end face;

a layer of wear-resistant material on the side extending to and defining a cutting edge, the layer having an end face merging with the end face of the steel body and defining a cutting edge closely juxtaposable with the cylinder, the end face of the steel body having a counter edge more remote from the cylinder than the cutting edge; and an array of grooves formed in the end faces of the layer and of the steel body, extending transversely from the cutting edge on the edge face, and spaced from one another parallel to the cutting edge.

* * * * *